US007376573B1

(12) United States Patent
Costonis et al.

(10) Patent No.: US 7,376,573 B1
(45) Date of Patent: May 20, 2008

(54) CLAIMS DATA ANALYSIS TOOLKIT

(75) Inventors: Michael A. Costonis, Springhouse, PA (US); Dirk Wehrmann, Mettmann (DE); Annette Kuck, Hamburg (DE)

(73) Assignee: Accenture LLP, Chicago, IL (US)

( * ) Notice: Subject to any disclaimer, the term of this patent is extended or adjusted under 35 U.S.C. 154(b) by 0 days.

(21) Appl. No.: 09/559,725

(22) Filed: Apr. 28, 2000

(51) Int. Cl.
*G06Q 40/00* (2006.01)
(52) U.S. Cl. ............................... 705/4; 705/2
(58) Field of Classification Search ............ 705/4, 705/2, 3, 8, 9, 32
See application file for complete search history.

(56) References Cited

U.S. PATENT DOCUMENTS

| | | | |
|---|---|---|---|
| 4,667,292 A * | 5/1987 | Mohlenbrock et al. ........ | 705/2 |
| 5,307,262 A * | 4/1994 | Ertel .............................. | 705/2 |
| 5,359,509 A * | 10/1994 | Little et al. ..................... | 705/2 |
| 5,671,409 A * | 9/1997 | Fatseas et al. ............. | 707/104.1 |
| 5,712,984 A * | 1/1998 | Hammond et al. ......... | 396/177 |
| 5,930,759 A * | 7/1999 | Moore et al. .................. | 705/2 |
| 5,950,169 A | 9/1999 | Borghesi et al. ............... | 705/4 |
| 2003/0014342 A1* | 1/2003 | Vande Pol .................. | 705/36 |

OTHER PUBLICATIONS

LePere, Cecilia An actuarial viewpoint. (loss comparisons), Risk Management, v40, n3, p. 49 Mar. 1993 Dialog File 149 Accesion 06414683.*

Haugh, Richard "Extractions: Chop, Chop", Hospitals and Health Networks, v73n4, p. 22-24, Apr. 1999, Dialog file 15 Accession 01806011.*
Greene, Marvin V., "Medicine starting to see the value in data", American Medical News, v42, n2 p. 26, Jan. 18, 1999, Dialog file 148 Accession 11771384.*
Anonymous, "Complying with Medicare's Claims-Processing Requirements" Physician Manager, v9,n6,Mar. 27, 1998, Dialog file 636 Accession 03852870.*
SAP, Andersen offer P-C product; Tremblay, Ara C; National Underwriter (Property & Casualty/Risk & Benefits Management); v102n16; pp. 43 Apr. 20, 1998; pp. 1-2.*
SAP, Andersenoffer P-C product; Trembly, Ara C; Ntional Underwriter (Property & Casualty/Risk & Benefits Management); v102n 16; pp. 43 Apr. 20, 1998; pp. 1-2.*

* cited by examiner

*Primary Examiner*—Andrew Joseph Rudy
*Assistant Examiner*—Vanel Frenel
(74) *Attorney, Agent, or Firm*—Brinks Hofer Gilson & Lione

(57) ABSTRACT

Methods and systems consistent with the present invention provide for evaluating optimal claim handling. The process includes receiving information associated with claims. Based on the information associated with the claims, responses are provided to a set of queries contained in one or more questionnaires. Based on the responses to the queries, a loss economic opportunity is calculated which is associated with processing the plurality of claims based on the responses. Further, a best practice is determined based on the loss economic opportunity.

108 Claims, 8 Drawing Sheets

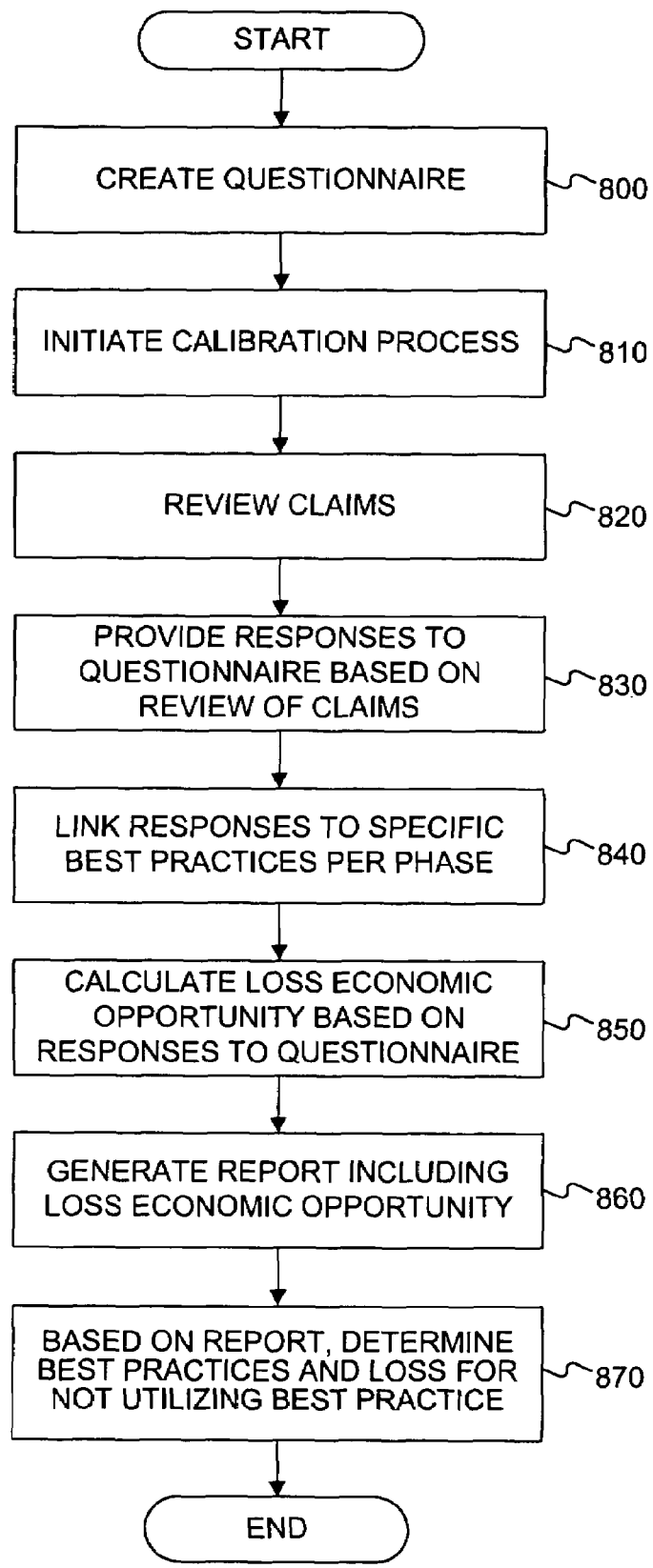

CLAIMS DATA ANALYSIS TOOLKIT

FIELD OF THE INVENTION

The present invention relates generally to data processing systems, and more particularly to a claims data analysis system.

BACKGROUND OF THE INVENTION

Insurance companies today complete insurance claims using company practices with the hopes of settling claims for an appropriate sum. Any audits that are conducted on the claims processing are conducted either manually or by using a system which can only calculate basic information including the number of claims processed by any particular claim handler, the amounts paid out on claims and the time frame for processing claims.

This type of information is not sufficient in determining whether claims are being processed efficiently and cost effectively. There are limited means, which are costly and time consuming, to calculate whether an insurance company is properly paying out on claims without overpaying. Further, it is difficult to calculate whether claims handlers are using the best methods for streamlining the claims handling process.

As such, there is a need for a system which can review the claim handling process more completely in order to give an insurance company an idea of what company practices are beneficial, whether the amount paid out on the claims were appropriate, and whether claims are being handled efficiently and properly.

SUMMARY OF THE INVENTION

Accordingly, systems and methods consistent with the present invention substantially obviate one or more of the problems due to limitations, shortcomings, and disadvantages of the related art by providing for a toolkit for analyzing claim processing and determining a best practice and a loss economic opportunity.

In accordance with the present invention, as embodied and broadly described herein, a system and method for claims data analysis, wherein the process includes receiving information associated with a plurality of claims; providing responses to a set of queries associated with the information; determining a loss economic opportunity associated with processing the plurality of claims based on the responses; and determining a best practice based on the loss economic opportunity.

Both the foregoing general description and the following detailed description are exemplary and explanatory only, and merely provide further explanation of the claimed invention.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 8 depicts a flow chart of the steps performed for calculating the loss economic opportunity and best practices and the loss for not utilizing the best practice consistent with the present invention.

DETAILED DESCRIPTION

Reference will now be made in detail to an implementation consistent with the present invention. Wherever possible, the same reference numbers will be used throughout the drawings to refer to the same or like parts.

Overview

Methods and systems consistent with the present invention provide for a claims data analysis toolkit (CDA toolkit) which provides for a claims auditing process determining the economic impact of claims handling. The CDA toolkit provides generally for users to create questionnaires or use questionnaires provided by the toolkit, provide responses to the questionnaire based on a review of claims, link responses to specific best practices that were invoked in processing the claims, and generate a report which determines best practices for use in claims processing and calculating a loss economic opportunity based upon failure to use the best practices.

It can be appreciated by one of ordinary skill in the art that the following toolkit can be used for analyzing the claims handling process from various points of view including the claims handling process overall, per phase or for a particular type of claim, for example automobile accident claims.

Figure 1:
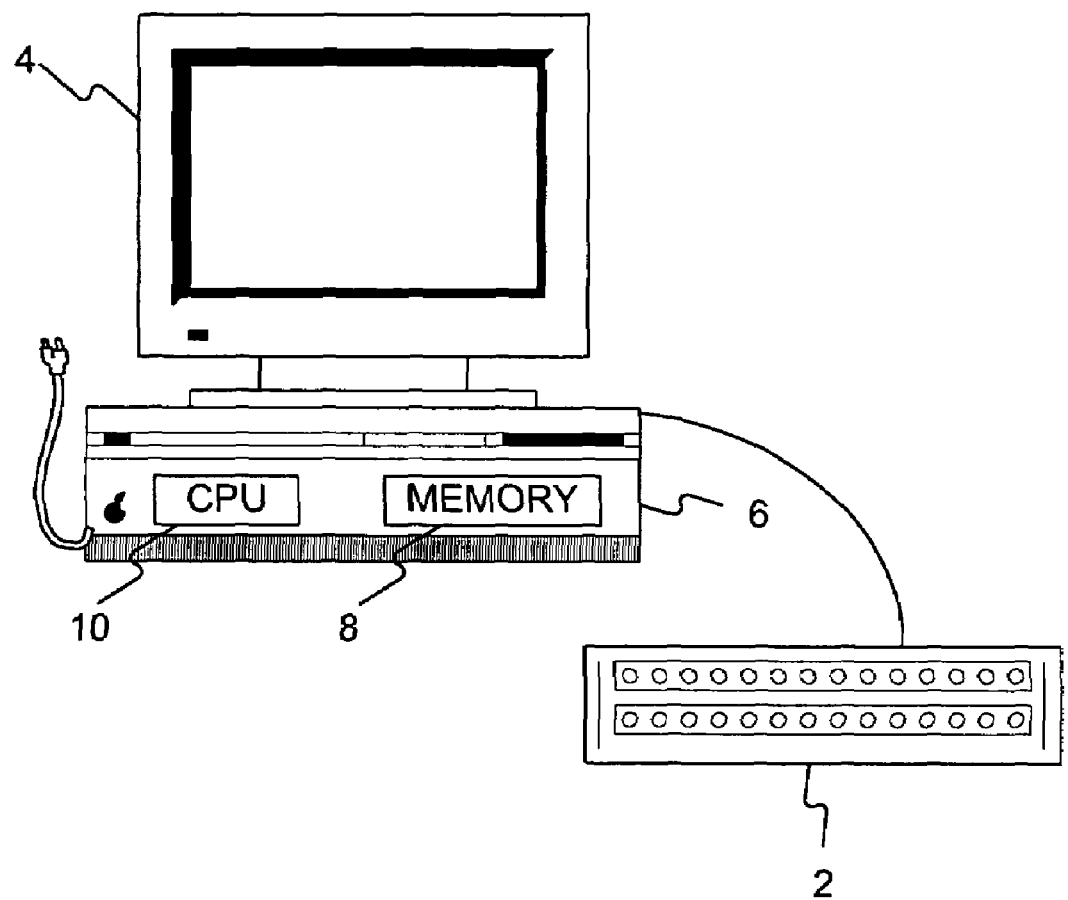
FIG. 1 depicts a block diagram of a system in which methods consistent with the present invention may be implemented.

FIG. 1 shows an example of a system in which the present invention may be implemented. The system comprises an input device 2, display 4 and a computer 6 which includes a memory 8 and a central processing unit 10. It can be appreciated by one of ordinary skill in the art that the present invention can be implemented on the system displayed in FIG. 1 or in a distributed system containing a server computer and client computers.

Figure 2:
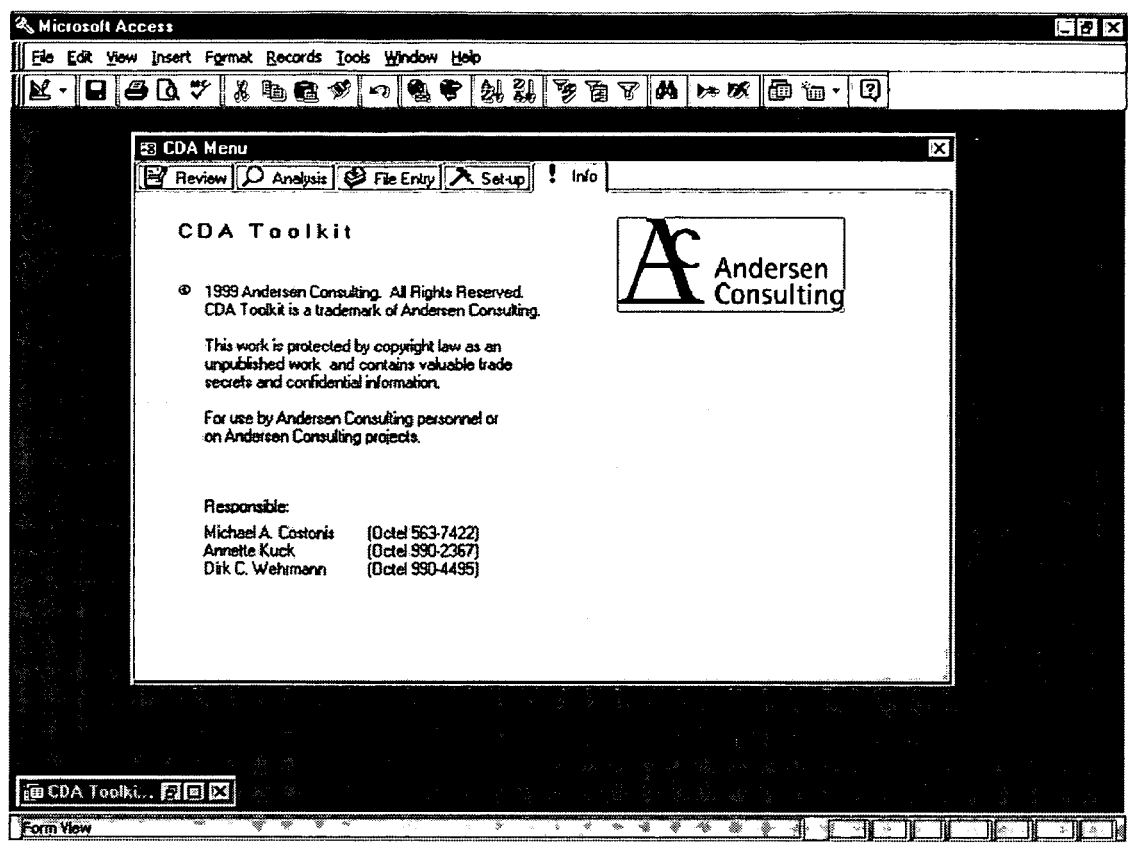
FIG. 2 depicts a pictorial diagram of a view of a user-interface that a user may be presented with upon access to a claims data analysis toolkit consistent with the present invention.

FIG. 2 shows a pictorial diagram of a view of a user interface a user may see upon accessing the claims data analysis toolkit.

Claims Data Analysis Components

Figure 3:
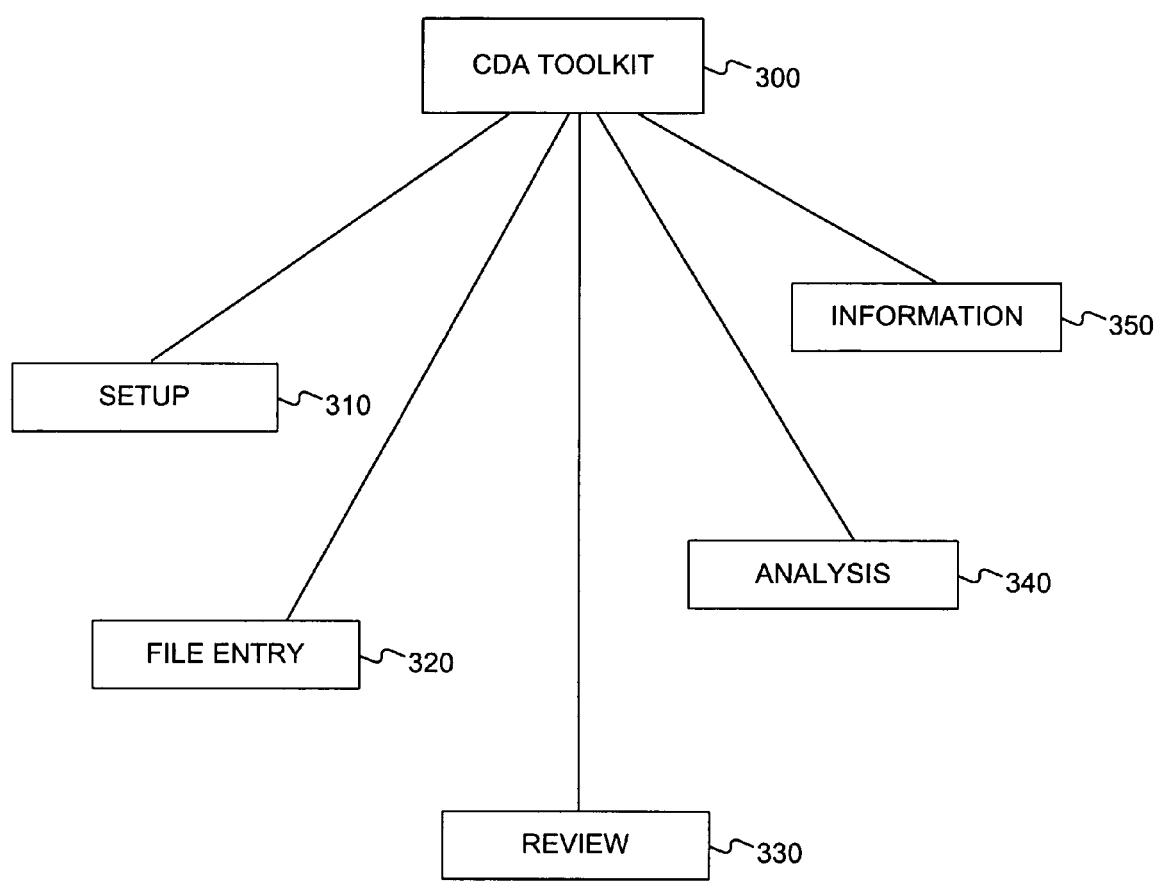
FIG. 3 depicts a block diagram of the main components in the claims data analysis toolkit consistent with the present invention.

As shown in FIG. 3, the CDA toolkit 300 consists of five segments: setup 310, file entry 320, review 330, analysis 340 and information 350. These segments can be visually represented in the form of menus wherein a user can select different options from different menus. For example, from a menu in the CDA toolkit, the user can select the setup 310 menu, file entry 320 menu, review 330 menu, analysis 340 menu or information 350 menu. Any reference to segment herein can be represented on a display as any type of menu. The first segment, set up 310, provides for initial data entry and allows a reviewer or a user or administrator of the system to initialize the database in order to prepare for claim reviews. The second segment, file entry 320, allows a reviewer or administrator to capture and view the relevant information connected with requested and received claim files. The third segment, review 330, allows a reviewer or administrator to access and input information regarding ongoing claim file reviews. This segment can be used to assign specific claim files to the reviewers as well as to perform a continuous data entry from the completed questionnaires returned by the reviewers. The fourth segment, analysis 340, allows a user or administrator to generate reports based on information entered by the reviewers in the previous segments. And the last segment, information 350, contains information regarding the CDA toolkit including copyright information and version of the program.

Setup

Figure 4:
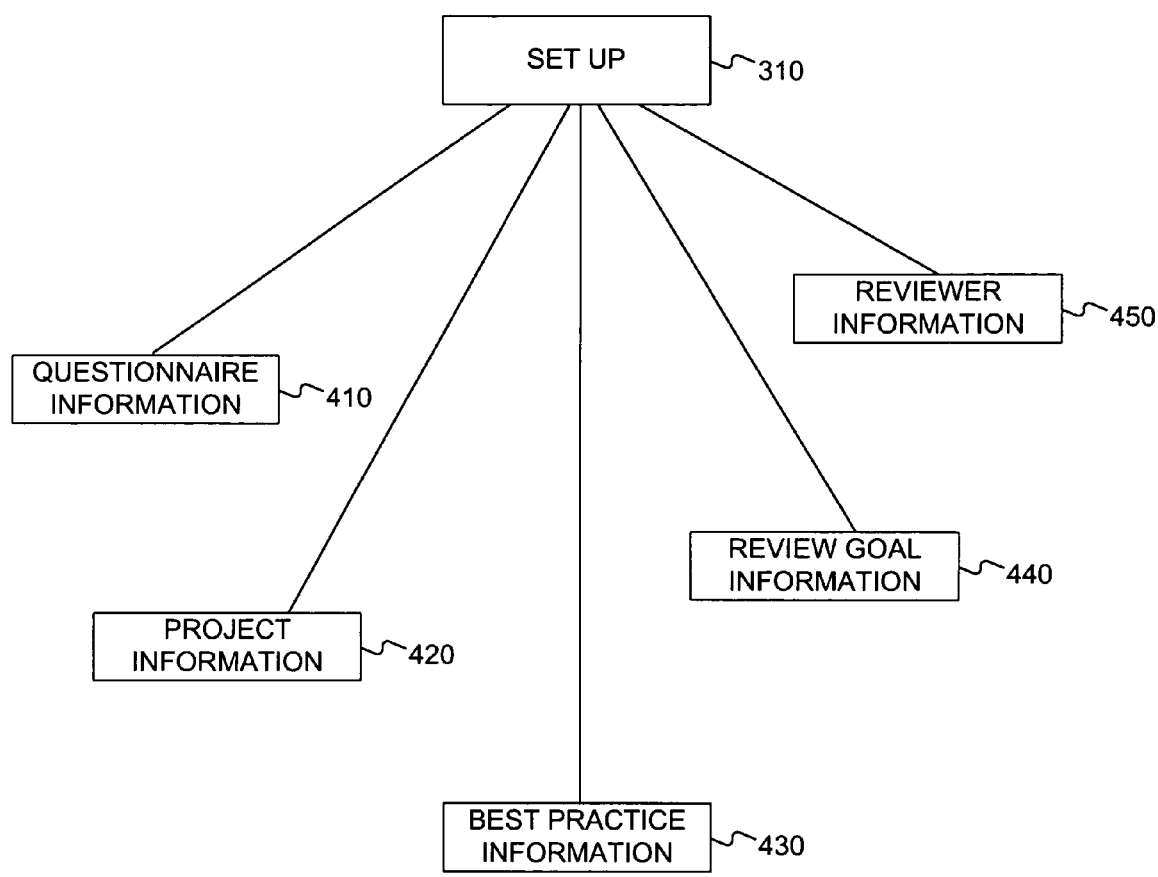
FIG. 4 depicts a block diagram of the main components of the setup module in the claims data analysis toolkit consistent with the present invention.

As shown in FIG. 4, setup 310 is broken down into five segments: Setup 310 allows a reviewer or administrator to initialize the database in order to prepare for completing claim file reviews. Questionnaire information 410 provides for the initial entry of questions and answer choices and further provides for a selection of in which languages the questionnaire will be offered. All of the selected questions and answer choices can be viewed in any of the languages provided. For example, the questions can be offered in English and German or Dutch. The user can toggle between languages at any stage of the claims analysis process.

A reviewer or administrator in the setup stage can choose between standard questionnaires that are provided with the system or can choose to customize their own questionnaires. The user also has the ability to modify standard questionnaires by deleting questions and/or adding new questions. Standard questionnaires, for example, could be in the automobile, liability, property and accident lines of business. The questionnaire can handle responses in the form of multiple choice, date, currency, open ended or free form responses. All of the responses are searchable for reporting purposes.

Project information 420 enables an administrator or reviewer to enter the project name and a brief description of each project within the overall program that has an impact on the realization of the economic opportunities identified during the claims data analysis. These projects that have been input will appear in the "opportunity per project" report in the analysis segment of the system.

Best practice information 430 allows a reviewer or administrator to enter best practices (BP) identification information which is to be used in the claims data analysis to capture the loss economic opportunity. It can be appreciated by one of ordinary skill in the art that the reviewer can select from a standard set of best practices provided for the automobile, liability, property and accident lines of business, or the reviewer can create his own best practices. The following represents examples of best practices and what characteristics that best practice denotes together with a best practice reference number:

TABLE 1

| Phase | Description | BP Ref # |
|---|---|---|
| Notification | Immediate Notification:<br>High rate of immediate notification of claims the by the insured person or claimant or other relevant parties: | 6 |
| | Only this gives the opportunity to the claims handler to handle the claims fast and proactively.<br>Possible Practices: | |
| | Offer the insured benefits when the claims notification is received within a certain time frame after the claim event took place<br>Give business cards to the insured person with the claims-contact, that can be used by the insured or be given to the claimant for example in combination with another give-away that is useful in the car (pen and notebook for the car, car-map, etc.). Should include policy and partner No. and used phone number should make possible to identify that the insured or claimant used the business card (e.g. the number includes a certain prefix).<br>Service number that the insured or claimant<br>Completeness of Notification<br>Secure completeness of the notification for a quick first contact and quick assignment of the claim to the competent and responsible unit (in combination with BP 6).<br>Minimum standard of notification information is necessary, especially concerning contact address/phone number.<br>Possible Practices: | 7 |
| | Use of adequate forms<br>Use of texts for the Call center (SSC) and electronic forms<br>highly trained CallCenter-staff<br>Immediate data entry of notification data<br>Data entry of notification data has to be done immediately when the notification is received. This also improves the quality of customer service because relevant claims data are accessible in the system.<br>Possible Practices: | 10 |
| | Automatic Data Entry in the system when a service that identifies the insurer of a car by plate number calls in to inform about a claim | |
| Claim set up, Coverage | Immediate and correct verification of coverage.<br>It is checked/verified whether the claim is covered by the existing coverage. | 8 |

TABLE 1-continued

| Phase | Description | BP Ref # |
|---|---|---|
| | Possible Practices, problems to be solved: | |
| | Find a solution for applications that have reached underwriting, but that are not processed yet (no underwriting data in the system). Separate an MR-specific Pipeline, because the MR-products generate specific problems for the claims handler. Underwriting should highlight special agreements (or clauses) in a contract. This should be visible as well in the claims application. | |
| | Set immediately appropriate reserve | 9 |
| | critical claims can be early identified (also helps for allocating the claims to the right unit for claims processing) Improvement of the quality of accounting information Possible Practices: | |
| | Set comprehensive coverage reserve based on system data for motor use of calculation tool, easy to use/intuitive Follow/Copy Best Practice Immediate set of the reserve also when claims is handled by the agency. (Included in BP8) Underwriting should highlight special agreements (or clauses) in a contract. This should be also visible in the claims application. | 40 |
| Assignment | Quick assignment to claim handlers: Assignment of claims to the responsible claims handler the same day as the notification is received (immediate assignment to the Pipeline if claim notification is received by the Call-Center, Assignment within 4 hours either to SSC or the Pipeline if the claim notification is received by the agency.). Possible Best Practices: | 11 |
| | Standardized criteria that are simple and known by every staff. Based on complexity and category of claim. (e.g. domestic claims/international claims) Target: Agencies should easily be able to contact directly the responsible claims handler at the responsible unit. Refer claim electronically Immediate assignment of claims files | |
| | Identification of the right claims handler: Identification of the right claims handler (criteria: skills, experience, workload, availability) at the first try (in 80% of cases). | 12 |
| | Refer files to next responsible unit/claims handler as fast as possible: Accelerate the process of the "hand-over of a claim" (unproductive time should be reduced to less than 2 days). | 13 |
| Contact | Affective management of rental car issues: Offer compensation for not using a rental car or intermediate a car of a cooperating rental car company. | 2 |
| | Reduce rental-car costs Improve customer service (rental car is delivered to the customer for his convenience) | |
| | Quick contact with the insured person, claimant and other relevant parties: After the responsible unit is informed about the claim the claims handler contacts immediately the insured person, the claimant or other relevant parties in order to gather needed information and to plan and define the next steps (transparency for the relevant parties). | 3 |
| | Transparency builds trust and helps the negotiation. Reduced likelihood that the claimant or the insured involves an attorney. Possible Practices: | |
| | If appropriate symbolic gestures (like Flowers) Claim-specific telephone-training (building trust by transparency) | |
| | Use of contact with garage Use of contact with garage to get the contact of the claimant and to be able to contact the claimant directly. | 27 |
| | Fixing Screens by PLUS-Partners: Fixing Screens by PLUS-Partners e.g.: | 52 |
| | cooperative garages CarGlass Assumption when calculating LEO: Fixing a screen: likelihood to capture opportunity 40%) | |
| Investigation | Online-Appraisal (AudaMail): Electronic data exchange for appraising the damage of a car (via AudaMail; Assumption.: in 40% of cases possible; even applicable for total damage | 1 |
| | Avoids costs for appraiser Speeds up the car-fixing process and avoids additional costs Agreement to pay indemnity immediately based on appraisal | 33 |

TABLE 1-continued

| Phase | Description | BP Ref # |
|---|---|---|
| | Fast and reliable agreement to pay the indemnity based on the appraisal-result connected with immediate payment to the garage (this process should be implemented with cooperative garages). | |
| | Avoids an increased bill compared to the former appraisal | |
| | Sufficient and qualified depth in investigation | 32 |
| | The claims handler investigates deeply and critically the circumstances of the claims in order to develop a complete and consistent picture of how the claim occurred. | |
| | Following cases need a deep investigation: | |
| | Cases with unclear loss allocation agreement-conditions (TA) when TA-partners negotiate for their money | |
| | unclear liability issues | |
| | Practices: | |
| | Identification of more complicated cases and assigning those cases to the adequate claims handler or Pipeline. | |
| | Training | |
| | Avoiding of appraisals that are not necessary. | 28 |
| | Request of appraisals and medical reports only when really necessary. Use the contacts to garages. | |
| | Possible Practices: | |
| | Define criteria when appraisal is necessary (based on value of the car and claims amount. | |
| | Choosing the right Expert/Appraiser: | 5 |
| | Assignment of the right expert or appraiser, that is competent and works for a reasonable price (using a expert/appraiser database). Avoiding experts or appraisers that are related to the insured or the claimant. | |
| | Possible Practices: | |
| | Find cooperation partners among the external expert or appraisers | |
| | for the relevant Regions | |
| | with relevant specializations | |
| | with E-Mail connection for a fast and easy communication | |
| | Make the assignment easier for the claim handler by giving him an overview of the available partners | |
| | Management of appraisers and experts: | 14 |
| | Management of Appraisers/field service: | |
| | Appropriate management (in time) of appraisers/field service: | |
| | Completeness of claim related information that is given to the assigned appraisers/field service | |
| | quick assignment followed by information exchange | |
| | critical review of the report or appraisal | |
| | Qualified, autonom investigation by the field service | 37 |
| | Intermediation of a partner garage | 16 |
| | the car gets fixed faster (reducing additional claims costs) | |
| | makes claims handling easier for the client (improved customer service) | |
| | Reduced costs (man power and devices) | |
| | Special service for comprehensive coverage claims: | 17 |
| | Complete problem solving service for comprehensive coverage customers (as a feature of specific products, e.g. products for business/industry clients). The service includes e.g. -to fetch the damaged car and transport it to the garage to be fixed. Fetch a rental car and bring it to the client, purchase a similar car in case of total damage, etc. | |
| | improved customer service | |
| | improved cost control | |
| | Optimize correspondence and documentation: | 18 |
| | Especially during investigation: | |
| | acceleration of investigation | |
| | improved quality of investigation results | |
| | time savings | |
| | Possible Practices: | |
| | Appraisals to be captured in the DVS (QW) | |
| | Create and send the appendix via IPDT | |
| | IPDT via Fax, e.g. TOPCALL | |
| | Agency-or broker information-letters via fax | |
| | Office equipment (min. 1 Fax per floor) | |
| | Faxreceiver | |
| | Internet- E-Mail connection | |
| | Fixing cost guarantee-document as TopCall-document in IT | |
| | Free space for individual comments at letters sent with checks or bank-transfer. | |
| | Investigation conducted by the field service: | 35 |
| | Investigation conducted by the field service in appropriate cases. Authorization to pay and close the claims straight away, if possible. | |

TABLE 1-continued

| Phase | Description | BP Ref # |
|---|---|---|
| | Standardized, appropriate investigation steps in case of car-theft. | 45 |
| | Technological support of claims handlers: | 51 |
| | Sufficient and quick technical support of claims handlers especially in the investigation phase. (s. BP 5) | |
| | Standardized, appropriate investigation steps in case of bodily injury: | 57 |
| | Possible Practices: | |
| | Always request the long version of the medical report | |
| | If there are some doubts and if additional information is required, request additional (historical) health information about the injured. | |
| | Special investigation in HWS (Check type of car, Type of car damage, etc.) | |
| Fraud | Qualified investigation for fraud-suspicious claims: | 19 |
| | In case of a fraud suspicious claim a specific and appropriate fraud investigation is conducted (Keep the balance between additional investigation effort and customer service) | |
| | Possible Practices: | |
| | Fraud-Pipeline, only for some cases | |
| | Availability of fraud specialized claims handlers in every region | |
| | Fraud training (Identification of fraud, Training for communication, methodology and techniques when conducted fraud investigation) | |
| | Implement Fraud-Warning mechanisms | |
| | (Lists with Fraud-Indicators) | |
| | Deliver input to database electronically | |
| | result oriented claims-handling if fraud suspicious claim | |
| Evaluation | IT-supported payments: | 20 |
| | Improvements concerning IT-support of payments to claims and adjustment of the reserve simultaneously (Consolidation of the programs 550/556). | |
| | Possible Practices: | |
| | Integration of calculated functionality in text processing tools | |
| | Integration of text processing tools and programs for payment-processing | |
| | Automatic calculation of payments when creating offer letter. | |
| | Availability of Reference Information for Evaluation: | 15 |
| | Possible Best Practices: | |
| | Important information are electronically accessible, e.g., specific journals, Tables with prices | |
| | Tax lists | |
| | Indemnity payments for injury types | |
| | Pricing-list for value-determination of cars | |
| | List for compensation amount when not taking a rental car and rental car prices | |
| | Case Law and expert's opinions | |
| | Insurance terms and conditions | |
| | Considering the "time value" of some devices to reduce payment, | 41 |
| | e.g. Payment according to appraisal | |
| | Avoid multiple payments | 48 |
| | Better: One consolidate payment if recipient is the same person | |
| | Minimize costs when the indemnity is payed only based on an appraisal | 46 |
| | Apply regional average working costs and do not pay add-ons for some specific devices when the indemnity is payed only based on an appraisal. | |
| | Review of bills and receipts | 49 |
| | Consider certain discounts for devices in case of self-fixing by the customer: | 54 |
| | Industrial customers, that can fix the damage themselves and get discounts for certain needed devices, only get the paid the price considering the discount on those devices (if this is part of the insurance terms/conditions; like for some MR and some industrial customer-products). | |
| | Calculation of bodily injury indeminities: | 55 |
| | A Tool was developed to support the accurate calculation of very bad cases of bodily injury and pension-payments. | |
| Negotiation | Quick and offensive claims-handling; | 21 |
| | which means: | |
| | a. fast and complete settlement of the claim | |
| | or | |
| | b. payments (indemnity) that without any doubt have to be given to the insured or claimant should be processed as soon as possible. | |
| | Best Practices: | |
| | Identification of process-steps that lead to a delay in the claim processing (e.g. Request of the police report or of a medical report). Description of alternatives that accelerate the process (e.g. payment of that part of the indemnity that have to be paid for sure.) | |
| | these actions are building trust and helps to conduct further negotiation steps | |
| | these actions are building trust and decrease the likelihood of the involvement of an attorney | |
| | Face to face negotiation: | 22 |
| | Assignment of field adjuster when appropriate to conduct negotiation or negotiation by the claims handler (if possible per phone) | |
| | Best Negotiation strategy and qualified negotiation: | 29 |

TABLE 1-continued

| Phase | Description | BP Ref # |
|---|---|---|
| | Possible Practices: | |
| Recovery | training of negotiation techniques<br>Identify quickly and systematically recovery potential<br>Recovery potential is identified as soon as possible.<br>Practices: | 23 |
| | Highlight Recovery potential<br>Identify Recovery potential as soon as possible<br>Capture quickly and systematically recovery potential<br>Recovery potential is captured quickly and systematically (with a consequent follow-up plan on recovery demands). | 31 |
| Medical Management | Support of the reintegration into work life:<br>Sufficient support of the person that has a high risks of staying without employment as a consequence of the accident by trying to achieve a reintegration into work life | 56 |
| Litigation Management | DAV-Agreement:<br>Use DAV-Agreement to process 15/10-Payment | 38 |
| | Management of own attorney<br>Choose the appropriate attorney | 42 |
| | Choice of attorney based on their specialization and former experiences with the attorneys<br>Trial management by claims handler when appropriate<br>Management and information exchange with the attorney | |
| Marketing | Establish a customer-complaints-management process<br>Establish customer complaints management process (apply this as well to specific PLUS-Partners): | 24 |
| | Avoiding further conflicts in the negotiation phase or during litigation<br>Avoid cancellations by the client after a comprehensive coverage claim<br>Retrieve information via Claim-reference-data as search criteria<br>i.e. retrieve Partners/and relevant parties when using e.g. claim number or claims handler as search criteria | 34 |
| | Inform client when claim handling is completed.<br>e.g. when payment is processed directly to the garage or to a claimant (liability) | 43 |
| | Appropriate standard-letters: | 39 |
| | only one text processing system, flexible modification of standard letters is possible, text modules can be added or erased, standard letters can be combined, etc.<br>Simplify selection of standard letters<br>improve wording of standard letters | |
| | High quality of communication and correspondence<br>critical review of general correspondence and appraisals, etc. | 47 |
| | use appropriate communication channel<br>Improve wording<br>Use spell-check<br>use appropriate form and completeness (internal communication)<br>Precise application of standard letters, use them only when applicable! If not individual letter is necessary.<br>When writing a reply to a letter of a relevant party answer systematically all points that were addressed in the initial letter. Don't use a simple standard letter that neglects some of the points addressed.<br>Use appropriate address.<br>Use spell-check.<br>completeness and appropriate form (internal communication)<br>Practices: | |
| | telephone training<br>QA of written communication<br>Optimize use of communication channels<br>Voice Mail Box for each claims handlers. | |
| | Improve Quality of partner data | 50 |
| | Avoid duplicate records of partner data<br>Complete data entry of partner-contact (phone number)<br>Standardized Naming (ie. for attorneys, garages)<br>Up-date addresses<br>(use for address-connected insurance types like house insurance etc.) | |
| Supervision | Regular review of open claims:<br>Select and review open claims based on indicators (e.g. complexity of claims) and random: | 25 |
| | Problem cases can be identified earlier<br>Permanent quality review and permanent LEO identification | |

TABLE 1-continued

| Phase | Description | BP Ref # |
|---|---|---|
| | Possible Practices: | |
| | automatic selection of open claims based on indicators<br>Refer open claims to other Pipelines units if a defined time limit is trespassed<br>Information and training of claim staff based on their needs<br>Regular information about topics that are LEO-problem areas or customer service problem areas. | 26 |
| | Avoid typical mistakes in claims handling<br>Possible Practices: | |
| Cross-functional | Systematical analysis of samples, e.g. based on BP 25<br>Establish a communication plan for current issues<br>Information and training of claim staff based on their need<br>improve staff information<br>improve/accelerate information exchange between underwriting and claims units (e.g. about changes of insurance terms and conditions)<br>"Basic-Training for Claims";<br>Training of claims staff about basic issues of claim handling, e.g. liability issues, bodily injury issues.<br>Others, claims handling mistakes:<br>Every single mistake should only be discussed as an exception, if appropriate<br>Conduct the necessary follow-up steps to a contract during and after the claim processing | 36<br><br><br>44<br><br>53 |
| | Correction of a wrong contract classification<br>Correction of a wrong contract documentation<br>Possible Practices: | |
| | Highlight claim-relevant text information or keep them in a separate section in order to have them easily accessible | |

The best practices entered will appear in the "mentioned best practice", "best practice with LEO", "opportunity projection per best practice" and "best practice in reviews" reports.

Review goal information 440 allows a reviewer or administrator to enter the determined count of claim files which are planned to be reviewed within the claims data analysis. This ensures the system has the proper number of samples to constitute a statistically valid sample. This value can be calculated through standard statistical formulas. The system provides for a user to select a confidence level for the review, enter the total population of claims, and calculate the number of files to be reviewed based on the confidence level and population. The review goal information is utilized by the "assignment" reports and are used to calculate the number of files to be reviewed per segment and per location.

Reviewer information 450 allows a reviewer or administrator to provide all information related to the reviewing team which will mainly be used for the assignment of claim files to a specific reviewer. For example, this information can include the name of the claim reviewer, an identification number and/or any other type of information regarding the reviewer.

File Entry

Figure 5:
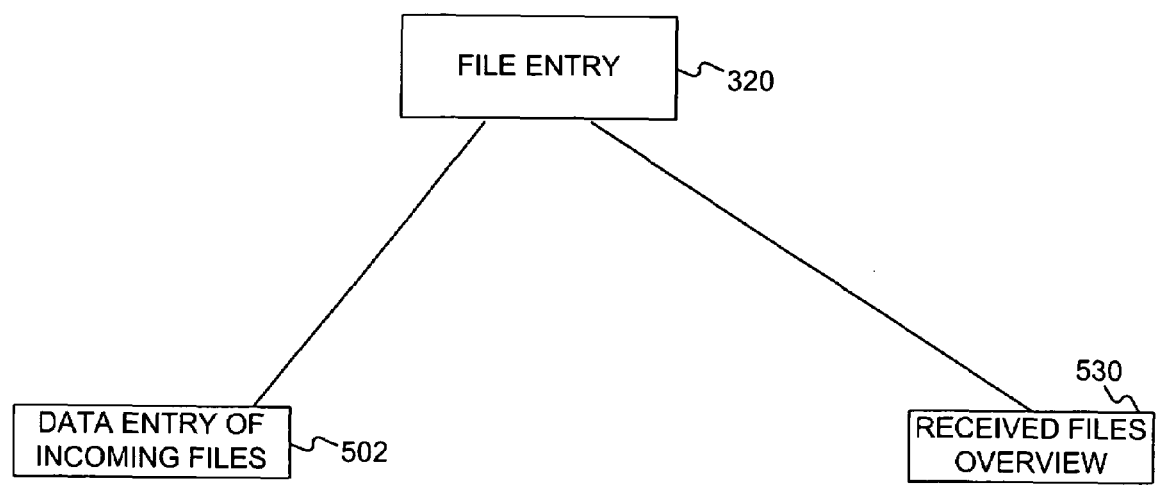
FIG. 5 depicts a block diagram of the main components of the file entry module in the claims data analysis toolkit consistent with the present invention.

As shown in FIG. 5, file entry 320 consists of two segments: data entry of incoming files 502 and received files overview 530. Data entry of incoming files 502 contains information on a single claim file or a particular group of claim files and can include, for example, claim handler identification, location of the file, claim number, a particular line of business relating to the claim file or particular group of files, or the amount for which a particular claim is being processed. Received files overview 530 contains information regarding the current status of received and entered claim files.

Setup 310 and file entry 320 make up the preparation phase of the claims data analysis system. Additional segments can be provided for in the preparation phase to provide for files for reference which contain claim files and/or review for reference information, evaluation results for each review, classification and loss economic opportunity summary results for each review, loss economic opportunity per phase results for each review, tracking of average loss economic opportunity development per line of business, tracking of average loss economic opportunity development per reviewer, and tracking of average loss economic opportunity development in total.

Additional segments can be provided for to allow for storing information about best practices, storing the definition of different service qualities for customer service, storing information about projects to implement improvements, and storing the relation between the best practice and the project which originally implemented the best practice.

Review

Figure 6:
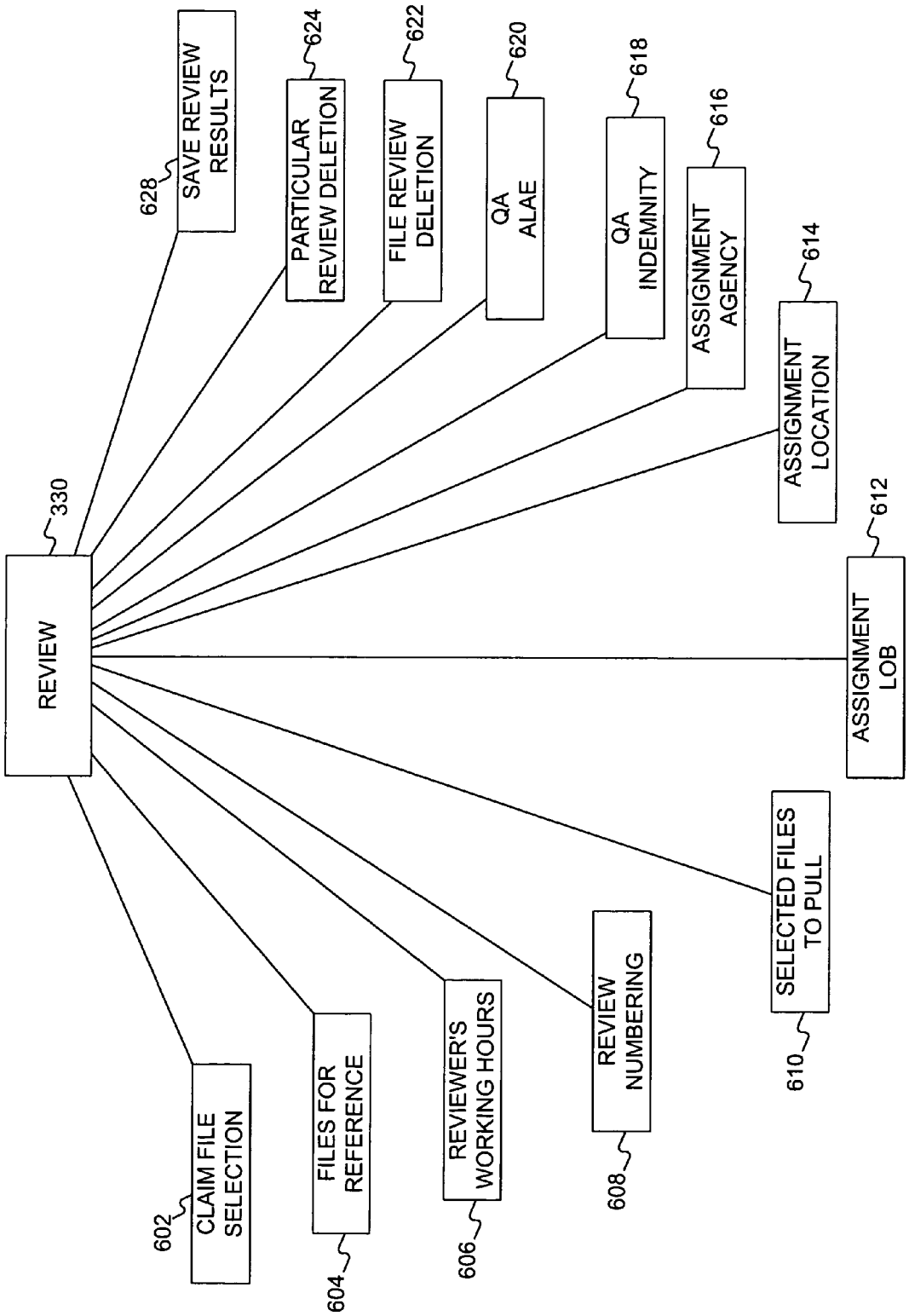
FIG. 6 depicts a block diagram of the main components of the review module in the claims data analysis toolkit consistent with the present invention.

As shown in FIG. 6, review segment 330 contains the following segments: claim file selection 602, files for reference 604, reviewer's working hours 606, review numbering 608, selected files to pull 610, assignment line of business (LOB) 612, assignment location 614, assignment agency 616, quality assurance (QA) indemnity 618, quality assurance allocated loss adjustment expense (ALAE) 620, file review deletion 622, particular review deletion 624, and save review results 628. These segments are for use in assigning specific claim files to reviewers as well as performing continuous data entry from the completed questionnaires returned by the reviewers.

Claim file selection 602 provides for a claim file assignment procedure to ensure that the file review goal will be reached on condition that all claims filed to be assigned to the reviewers will be selected evenly from all locations and that no reviewer will be confronted with a claim originally handled in his or her location. Files for reference 604, originally entered in the preparation phase, can be accessed by a reviewer to demonstrate good or bad examples of claim handling for training purposes. Reviewers working hours 606 provides information on the working hours for each reviewer for each file review. This data can also be used to update the net hours that the reviewer spends on actual claims data analysis on a regular basis. This information can also be used to measure performance for each reviewer and is automatically used to calculate the average number of reviewed claim files per day. This information appears on the "reviewers status report".

Review numbering 608 provides information on the total number of distributed paper questionnaires. This information helped to ensure a precise numbering of reviews or questionnaires and to avoid reviews getting mixed up due to identification inconsistencies. Selected files to pull 610 provides information to complete a daily report of all the claim files to be pulled. This information can be used to ensure that every reviewer receives the correct claim files. Assignment line of business 612 provides information identifying appropriate claim files to be reviewed by a particular reviewer and of recording this assignment in the system. This information can be used to ensure that the file review goal will be reached on condition that all claim files to be assigned to the reviewers will be selected evenly from all locations and that no reviewer will be confronted with a claim originally handled in his or her location.

Assignment location 614 provides information regarding the current status of the claim file assignment per claim handling location as well as goal. Agency assignment 616 provides information regarding the current status of the claim file assignment to agencies. Quality assurance indemnity 618 and quality assurance allocated loss adjustment expense (ALAE) 620 provide information regarding the consistency of the entered claims data analysis data. The answers provided to the questionnaire are reviewed for missing values and extreme or negative values. Missing values in the answers of the questionnaire can be identified in the "univariable question analysis" report. Redundant information is also checked with regards to the loss economic opportunity per phase and the summary loss economic opportunity.

File review deletion 622 allows a reviewer or administrator to completely erase the data of an entire claim file from the system. This information will no longer appear anywhere in the system and will not be reflected in any reports generated. Particular review deletion 624 allows a reviewer or administrator to erase the data of a specific file review (not an entire claim file) from the system. This ensures that the file review data will disappear from the entire system and will not appear in any reports generated. Save review results 628 allow a reviewer or administrator to save current review results. This allow for an ongoing overview of the claim file results and is a means for tracking performance of the reviewing team since comparisons between different periods can be made. The review segment constitutes the conduct phase of the claims data analysis toolkit.

Analysis

Figure 7:
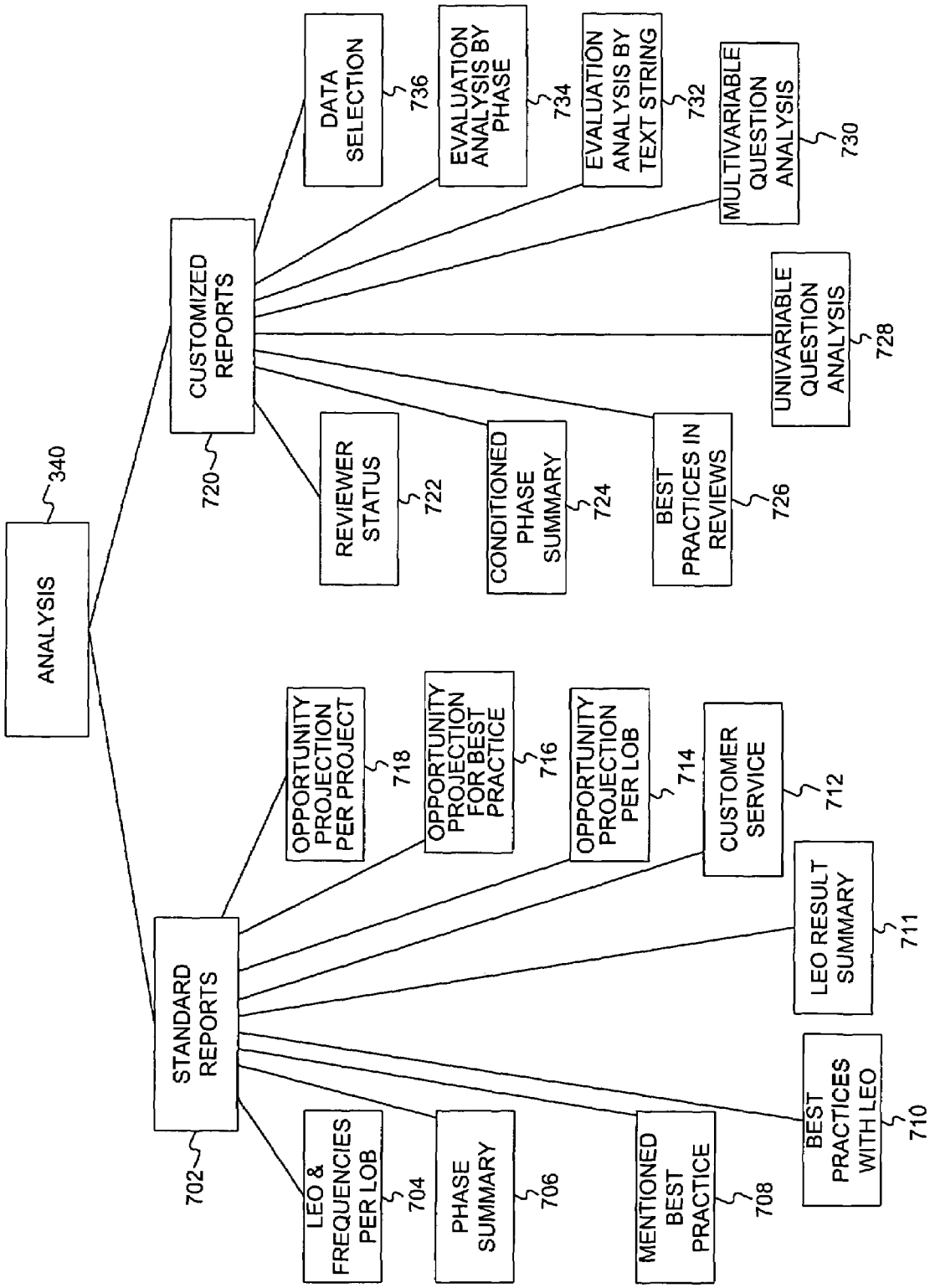
FIG. 7 depicts a block diagram of the main components of the analysis module in the claims data analysis toolkit consistent with the present invention.

As shown in FIG. 7, the analysis segment consists of two main segments. Standard reports 702 contains the following segments: LEO and frequencies per line of business 704, phase summary 706, mentioned best practice 708, best practices with LEO 710, customer service 712, opportunity projection per line of business 714, opportunity projection for best practice 716 and opportunity projection per project 718. Customized reports 720 consist of the following segments: reviewer status 722, conditioned phase summary 724, best practices in reviews 726, univariable question analysis 728, multi-variable question analysis 730, evaluation analysis by text string 732, evaluation analysis by phase 734 and data selection 736.

Standard reports 702 comprises a number of reports that can be generated based on the responses provided in the questionnaires. Loss economic opportunity and frequencies per line of business 704 is a report that indicates in which line of business the claims data analysis has found significant opportunities. This report shows the loss economic opportunity and the frequencies of loss economic opportunity for each analyzed line of business differentiating between indemnity and ALAE. In addition the total average percentage of loss economic opportunity is calculated for the indemnity and the ALAE. The average loss economic opportunity is calculated as the average of all already reviewed files out of that specific line of business.

Phase summary 706 is a report that shows for each phase in how many reviews loss economic opportunity has been identified and the amount of loss economic opportunity, differentiating between indemnity, ALAE and total claim cost (indemnity plus ALAE). The percentage describes the share of total loss economic opportunity in that specific phase. In addition the total absolute loss economic opportunity is presented for the indemnity, ALAE and the total. The report "phase summary" indicates for which phase the claims data analysis has found significant opportunities.

Mentioned best practice 708 is a report that shows the number of times each best practice is mentioned (both for a positive loss economic opportunity and customer service) and the average loss economic opportunity percentage. The best practices are sorted by phase. The score (count multiplied by average loss economic opportunity) should be used to identify a best practice with significant impact. The average loss economic opportunity is calculated as the average of all already reviewed files with the specific best practice mentioned.

Best practices with loss economic opportunity 710 is a report that shows for each best practice the number fo times the best practice was mentioned where the best practice was related to a positive loss economic opportunity and the average loss economic opportunity percentage for each best practice, differentiating between indemnity and the ALAE. The score (count multiplied by average loss economic opportunity) is used to identify the best practice with significant impact. The average loss economic opportunity in this report is calculated as the average of already reviewed files with the specific best practice mentioned and related to a positive loss economic opportunity.

LEO result summary 711 is a report which determines the statistical validity of the sample size reviewed to date based upon the review goal. The system utilizes the value calculated in the review goal information 440 and determines whether the sample size is statistically valid.

Customer service 712 is a report that shows which best practices are related to customer service. There are four types of customer service including competitive advantage for a service insurer today, innovative and competitive advantage for a service insurer in the future, important for a service insurer today, but not a competitive advantage, and innovative and important for a service insurer in the future, but not a competitive advantage. These customer service types can be customized. This report shows the number of times the best practice was mentioned where best practice was related to customer service, differentiating between the four types of customer service. The total count should be used to identify a phase or best practice with significant impact on customer service.

Opportunity projection per line of business 714 is a report which shows a projection of the total loss economic opportunity based on the underlying segmentation of the claim files and the claim volume of that segment. The average percentage loss economic opportunity is calculated for each segment, differentiating between indemnity and the ALAE. That percentage is multiplied with the total amount of cost for each segment and each cost type to gain the absolute opportunity per segment. Summarizing these figures leads to the total absolute opportunity. The total opportunity per line of business is not calculated on the basis of the average loss economic opportunity per line of business. This report helps to emphasize the differences in the loss economic opportunity by segments. The main results of this report is the accurate calculations of the total opportunity for all lines of business. In addition this report provides information on how many files in which segments are assigned and finished and how many reviews or questionnaires are finished. The count of finished files and reviews differ when there is more than one review per file. Opportunity projection per best practice 716 is a report which shows a production of the opportunities for each best practice, sorted by the phases of claim handling process. The opportunity is calculated by multiplying the total claim volume with the frequency of loss economic opportunity and the average loss economic opportunity (one loss economic opportunity occurs) for each best practice. This report also provides information regarding the count of mentioning where the best practice was related to a positive loss economic opportunity. This report helps to identify and quantify these best practices with high opportunities. In addition the report shows the total sum of opportunities.

Opportunity projection per project 718 is a report which shows how the total opportunity, which has to be realized, is allocated to the projects. The calculation of the total opportunity is based on the best practices, therefore the total amount is identical to the report "opportunity projection per best practice". This report helps to identify the projects which are responsible for realizing the main share of the opportunity.

Another segment of analysis 340 consists of customized reports 720 which allows a reviewer or administrator to customize reports. Reviewer status 722 is a report which gives a structured overview about the number of assigned files and finished files by a reviewer for a specified time frame. Information regarding the number of questionnaires or reviews is shown which only differs from the count of finished files when there is more than one review per file. There is additional information regarding the total number of work days for each reviewer and information regarding the average loss economic opportunity per reviewer, differentiating between indemnity, ALAE and total claim cost (indemnity plus ALAE). This report can be helpful for status checks as well as for the analysis of the reviewing team productivity and for a continuous calibration.

Conditioned phase summary 724 is a report that gives the same information as the phase summary but only for these reviews which fulfill a specified condition, i.e. only the reviews of files which have been handled in the claims office. Additional information appears on this report regarding the count of reviews meeting this condition and the total average loss economic opportunity for indemnity and ALAE for that condition subset. This report indicates which phase of the claims data analysis has found significant opportunities for a specific subset of reviews.

Best practices in reviews 726 does not create a report but opens a form with information in which review and in which phase a selected best practice was mentioned, and leads to a positive loss economic opportunity. This query identifies in which reviews or claim files a selected best practice would be applicable to realize a loss economic opportunity.

Univariable question analysis 728 presents for a selected question the count of chosen answers and for each answer the count of reviews or questionnaires with a positive loss economic opportunity and the average loss economic opportunity and the complete answer group, differentiating between indemnity and ALAE. If a reviewer or administrator has chosen a set of questions, each (univariable) question will be analyzed independently. This report indicates which situation (defined by a question) leads to a significant average loss economic opportunity or a significant loss economic opportunity frequency. The loss economic opportunity frequency has to be determined by comparing the total count of an answer choice with the count of positive loss economic opportunities. The average loss economic opportunity in this report is calculated as the mean of loss economic opportunity of all reviewed files with that specific answer.

Multivariable question analysis 730 reports similarly as the "univariable question analysis" but only for a more conditioned situation with a reduced subset of reviews. To reduce the subset of reviews you can enter two more questions, each with a specific answer choice. The third selected question is the one to be analyzed. The report also presents the count of chosen answers and for each answer the count of reviews or questionnaires with a positive loss economic opportunity and the average loss economic opportunity in the complete answer group, differentiating between indemnity and ALAE. Additional information is found in the report regarding the count of reviews meeting this condition and the total average loss economic opportunity for indemnity and ALAE for that subset. This report indicates which situation (defined by up to three questions) leads to a significant average loss economic opportunity or a significant loss economic opportunity frequency. The loss economic opportunity frequency has to be determined by comparing the total count of an answer choice with the count of positive loss economic opportunities.

The average loss economic opportunity is calculated as the mean of loss economic opportunity of all reviewed files with that specific answer.

Evaluation analysis by text string 732 contains information regarding evaluations which contain a certain text string, i.e. best practice 8 (from Table 1). The result is presented in a report and shows the claim file identification, the reviewer identification, the phase, if it is a good or poor practice and the detailed evaluation text. Additionally each data set is provided with a marker called "considered", which indicates if the current evaluation was used in the analysis before or not. This report enables a reviewer or administrator to investigate the evaluation part of the reviews by searching specific text strings and summarizing the related reviews. This functionality can be used for defining and describing new best practices.

Evaluation analysis by phase 734 provides information regarding all evaluations within a certain phase. The result is presented in a report and shows the claim file identification, the reviewer identification, the phase, if it is a good or poor practice and the detailed evaluation text. Additionally, each data set is provided with a marker called "considered", which indicates if the current evaluation was used in the analysis before or not. Using this report a reviewer or administrator has the ability to investigate the evaluation part of a specific phase and can summarize the related reviews. This functionality can be used for defining and describing new best practices.

Data selection 736 creates a data sheet with the most important review results of a specific subset of reviews. The subset can be defined by selecting a specific question and an answer choice from the questionnaire. The data sheet contains information regarding the claim file identification, the reviewer identification, indemnity, ALAE, and the absolute and relative loss economic opportunity for indemnity and ALAE. This data sheet can be exported by copy and paste to MS EXCEL for further analysis or special graphical representation.

User and System Process

FIG. 8 depicts a flowchart representing the method of calculating the best practice and the loss economic opportunity. The present invention allows a user to choose from a set of questionnaires that are provided in the system or to create his own questionnaires to be used in the analysis of the claims (step 800). A calibration process is performed (step 810) wherein all the users in the claims analysis process are trained to standardize the evaluation response process in responding to the questionnaire. Once the system is calibrated, the user reviews the claims (step 820), and provides responses to the questionnaires based on his review of the claims (step 830). The reviewer then links their responses to the questionnaires to specific best practices that were invoked during the claims process and can further be linked to the particular phase the best practice was used (step 840). For example, a reviewer can enter information indicating the net LEO identified in the particular claim file review, a value representing customer service identified in the particular claim file review, a first, second and/or third best practice identified in the particular claim file review, and a best practice weight (0% up to 100%) for which to attribute the customer service and best practices entered to the net LEO. The system then calculates a loss economic opportunity based on the reviewer's responses to the questionnaires (step 850).

After the loss economic opportunity is calculated, the reviewer has an opportunity to generate reports which include statistics on all aspects of claims processing. These reports include loss economic opportunity and the frequencies of loss economic opportunity for each line of business, frequency of best practices used, account for each best practice representing where the best practice was related to a positive loss economic opportunity and the average loss economic opportunity percentage for each best practice, which best practices are related to customer service, and a projection of the total loss economic opportunity based on the underlying segmentation of the claim files and the claim volume of that segment. After the reporting step (step 860), best practices and loss for not utilizing best practices are determined (step 870).

For example, a reviewer, in providing responses to a questionnaire may enter data reflecting anetLEO: $150, customer service value: 1, best practice 1: 17, and %: 100. Since a net LEO was indicated and best practice 1 was indicated and weighted 100%, this means that for that particular claim, the failure to use best practice 17 cost the insurance company $150 with a need for customer service.

CONCLUSION

Methods and systems consistent with the present invention provide for a claims data analysis toolkit which performs an audit on a claims processing system. Best practices are determined which specify those best practices to be used on particular types of claims. Loss for not utilizing the best practice is calculated. Loss economic opportunity is calculated where a company can evaluate the amount of money lost due to the claims handling process.

Although the present invention has been described with reference to a preferred embodiment, those skilled in the art will know of various changes in form and detail which may be made without departing from the spirit and scope of the present invention as defined in the appended claims and their full scope of equivalents.

What is claimed is:

1. A method for claims data analysis, comprising the steps of:
    receiving information associated with a plurality of processed claims;
    providing responses into an electronic data processing system in response to a set of queries associated with the information;
    selecting a subset of best practices from a predetermined set of best practices associated with a claims handling process;
    associating the subset of best practices with the responses;
    determining with the electronic data processing system a loss economic opportunity associated with processing the plurality of claims, where the loss economic opportunity includes a cost associated with processing the plurality of claims and is determined based on the responses; and
    identifying from the subset of best practices a best practice associated with processing the plurality of claims based on the loss economic opportunity.

2. The method of claim 1, wherein determining a best practice further includes:
    quantifying the best practice in terms of an economic effect in reduction of a cost associated with processing the plurality of claims.

3. The method of claim 1, wherein receiving information further includes:
    providing for at least one query to be completed in response to the information associated with each of the plurality of claims.

4. The method of claim 1, wherein providing responses further includes:
    providing the set of queries in more than one language; and
    allowing a user to toggle between queries in different languages.

5. The method of claim 3, wherein providing for at least one query further includes:
    designating at least one best practice used in processing each of the plurality of claims; and
    designating a weight for the one best practice to be applied to each of the plurality of claims.

6. The method of claim 1, wherein determining with the electronic data processing system a loss economic opportunity further includes:
    determining an actual cost for processing each of the plurality of claims; and
    evaluating the loss economic opportunity as a percentage of an absolute loss economic opportunity divided by the total claim cost.

7. The method of claim 6, wherein determining an actual cost further includes:
calculating the total claim cost as the sum of the indemnity and allocated loss adjustment expense.

8. The method of claim 6, wherein evaluating the loss economic opportunity further includes:
calculating the loss economic opportunity for the plurality of claims by averaging the loss economic opportunity for each of the plurality of claims.

9. The method of claim 1, further including:
generating at least one report indicating one of office organization, efficiency of processing the plurality of claims, and statistics on the processing of the plurality of claims.

10. The method of claim 1, wherein providing responses to a set of queries further includes:
calculating a number of responses to the set of queries to be reviewed based on applying standard statistical sampling formulae to the plurality of claims.

11. The method of claim 1, further including:
determining productivity based on a number of the set of queries responded to.

12. The method of claim 1, further including:
generating a standard report.

13. The method of claim 1, further including:
generating a custom report.

14. The method of claim 1, wherein providing responses to a set of queries further includes:
providing for a standard set of inquires in the set of queries in an automobile line of insurance.

15. The method of claim 1, wherein providing responses to a set of queries further includes:
providing for a standard set of inquires in the set of queries in a liability line of insurance.

16. The method of claim 1, wherein providing responses to a set of queries further includes:
providing for a standard set of inquires in the set of queries in an accident line of insurance.

17. The method of claim 1, wherein providing responses to a set of queries further includes:
providing for a standard set of inquires in the set of queries in a property line of insurance.

18. The method of claim 1, wherein providing responses to a set of queries further includes:
providing for a standard set of inquires in the set of queries in a worker's compensation line of insurance.

19. The method of claim 5, wherein providing responses further includes:
providing for a standard set of best practices in an automobile line of insurance.

20. The method of claim 5, wherein providing responses further includes:
providing for a standard set of best practices in a liability line of insurance.

21. The method of claim 5, wherein providing responses further includes:
providing for a standard set of best practices in a property line of insurance.

22. The method of claim 5, wherein providing responses further includes:
providing for a standard set of best practices in an accident line of insurance.

23. The method of claim 5, wherein providing responses further includes:
providing for a standard set of best practices in a worker's compensation line of insurance.

24. The method of claim 1, wherein the queries are provided in English.

25. The method of claim 1, wherein the queries are provided in German.

26. The method of claim 1, wherein the queries are provided in Dutch.

27. The method of claim 1, wherein the claims are insurance claims.

28. An apparatus for claims data analysis, comprising:
a receiving module for receiving information associated with a plurality of processed claims;
a providing module for providing responses into a data processing system in response to a set of queries associated with the information;
a selecting module for selecting at least one subset of best practices from a predetermined set of best practices associated with a claims handling process;
an associating module for associating the subset of best practices with the responses;
a determining module for determining a loss economic opportunity associated with processing the plurality of claims, where the loss economic opportunity includes a cost associated with processing the plurality of claims and is determined based on the responses; and
an identifying module for identifying from the subset of best practices a best practice from the subset of best practices associated with processing the plurality of claims based on the loss economic opportunity.

29. The apparatus of claim 28, wherein the determining module for determining a best practice further includes:
a quantifying module for quantifying the best practice in terms of an economic effect in reduction of a cost associated with processing the plurality of claims.

30. The apparatus of claim 28, wherein the receiving module for receiving information further includes:
a providing module for providing for at least one query to be completed in response to the information associated with each of the plurality of claims.

31. The apparatus of claim 28, wherein the providing module for providing responses further includes:
a providing module for providing the set of queries in more than one language; and
an allowing module for allowing a user to toggle between queries in different languages.

32. The apparatus of claim 30, wherein the providing module for providing for at least one query further includes:
a designating module for designating at least one best practice used in processing each of the plurality of claims; and
a designating module for designating a weight for the one best practice to be applied to each of the plurality of claims.

33. The apparatus of claim 28, wherein the determining module for determining a loss economic opportunity further includes:
a determining module for determining an actual cost for processing each of the plurality of claims; and
an evaluating module for evaluating the loss economic opportunity as a percentage of an absolute loss economic opportunity divided by the total claim cost.

34. The apparatus of claim 33, wherein the determining module for determining an actual cost further includes:
a calculating module for calculating the total claim cost as the sum of the indemnity and allocated loss adjustment expense.

35. The apparatus of claim 33, wherein the evaluating module for evaluating the loss economic opportunity further includes:
a calculating module for calculating the loss economic opportunity for the plurality of claims by averaging the loss economic opportunity for each of the plurality of claims.

36. The apparatus of claim 28, further including:
a generating module for generating at least one report indicating one of office organization, efficiency of processing the plurality of claims, and statistics on the processing of the plurality of claims.

37. The apparatus of claim 28, wherein the providing module for providing responses to a set of queries further includes:
a calculating module for calculating a number of responses to the set of queries to be reviewed based on applying standard statistical sampling formulae to the plurality of claims.

38. The apparatus of claim 28, further including:
a determining module for determining productivity based on a number of the set of queries responded to.

39. The apparatus of claim 28, further including:
a generating module for generating a standard report.

40. The apparatus of claim 28, further including:
a generating module for generating a custom report.

41. The apparatus of claim 28, wherein the providing module for providing responses to a set of queries further includes:
a providing module for providing for a standard set of inquires in the set of queries in an automobile line of insurance.

42. The apparatus of claim 28, wherein the providing module for providing responses to a set of queries further includes:
a providing module for providing for a standard set of inquires in the set of queries in a liability line of insurance.

43. The apparatus of claim 28, wherein the providing module for providing responses to a set of queries further includes:
a providing module for providing for a standard set of inquires in the set of queries in an accident line of insurance.

44. The apparatus of claim 28, wherein the providing module for providing responses to a set of queries further includes:
a providing module for providing for a standard set of inquires in the set of queries in a property line of insurance.

45. The apparatus of claim 28, wherein the providing module for providing responses to a set of queries further includes:
a providing module for providing for a standard set of inquires in the set of queries in a worker's compensation line of insurance.

46. The apparatus of claim 32, wherein the providing module for providing responses further includes:
a providing module for providing for a standard set of best practices in an automobile line of insurance.

47. The apparatus of claim 32, wherein the providing module for providing responses further includes:
a providing module for providing for a standard set of best practices in a liability line of insurance.

48. The apparatus of claim 32, wherein the providing module for providing responses further includes:

a providing module for providing for a standard set of best practices in a property line of insurance.

49. The apparatus of claim 32, wherein the providing module for providing responses further includes:
a providing module for providing for a standard set of best practices in an accident line of insurance.

50. The apparatus of claim 32, wherein the providing module for providing responses further includes:
a providing module for providing for a standard set of best practices in a worker's compensation line of insurance.

51. The apparatus of claim 28, wherein the queries are provided in English.

52. The apparatus of claim 28, wherein the queries are provided in German.

53. The apparatus of claim 28, wherein the queries are provided in Dutch.

54. The apparatus of claim 28, wherein the claims are insurance claims.

55. A computer-readable medium containing executable instructions for claims data analysis, comprising:
executable instructions stored on a computer-readable medium for receiving information associated with a plurality of processed claims;
executable instructions stored on a computer-readable medium for providing responses into a data processing system in response to a set of queries associated with the information;
executable instructions stored on a computer-readable medium for selecting at least one subset of best practices from a predetermined set of best practices associated with a claims handling process;
executable instructions stored on a computer-readable medium for associating the subset of best practices with the responses;
executable instructions stored on a computer-readable medium for determining a loss economic opportunity associated with processing the plurality of claims, where the loss economic opportunity includes a cost associated with processing the plurality of claims and is determined based on the responses; and
executable instructions stored on a computer-readable medium for identifying from the subset of best practices a best practice associated with processing the plurality of claims based on the loss economic opportunity.

56. The computer-readable medium of claim 55, wherein the executable instructions stored on a computer-readable medium for determining a best practice further includes:
executable instructions stored on a computer-readable medium for quantifying the best practice in terms of an economic effect in reduction of a cost associated with processing the plurality of claims.

57. The computer-readable medium of claim 55, wherein the executable instructions stored on a computer-readable medium for receiving information further includes:
executable instructions stored on a computer-readable medium for providing for at least one query to be completed in response to the information associated with each of the plurality of claims.

58. The computer-readable medium of claim 55, wherein the executable instructions stored on a computer-readable medium for providing responses further includes:
executable instructions stored on a computer-readable medium for providing the set of queries in more than one language; and executable instructions stored on a computer-readable medium for allowing a user to toggle between queries in different languages.

59. The computer-readable medium of claim 57, wherein the executable instructions stored on a computer-readable medium for providing for at least one query further includes:
  executable instructions stored on a computer-readable medium for designating at least one best practice used in processing each of the plurality of claims; and
  executable instructions stored on a computer-readable medium for designating a weight for the one best practice to be applied to each of the plurality of claims.

60. The computer-readable medium of claim 55, wherein the executable instructions stored on a computer-readable medium for determining a loss economic opportunity further includes:
  executable instructions stored on a computer-readable medium for determining an actual cost for processing each of the plurality of claims; and
  executable instructions stored on a computer-readable medium for evaluating the loss economic opportunity as a percentage of an absolute loss economic opportunity divided by the total claim cost.

61. The computer-readable medium of claim 60, wherein the executable instructions stored on a computer-readable medium for determining an actual cost further includes:
  executable instructions stored on a computer-readable medium for calculating the total claim cost as the sum of the indemnity and allocated loss adjustment expense.

62. The computer-readable medium of claim 60, wherein the executable instructions stored on a computer-readable medium for evaluating the loss economic opportunity further includes:
  executable instructions stored on a computer-readable medium for calculating the loss economic opportunity for the plurality of claims by averaging the loss economic opportunity for each of the plurality of claims.

63. The computer-readable medium of claim 55, further including:
  executable instructions stored on a computer-readable medium for generating at least one report indicating one of office organization, efficiency of processing the plurality of claims, and statistics on the processing of the plurality of claims.

64. The computer-readable medium of claim 55, wherein the executable instructions stored on a computer-readable medium for providing responses to a set of queries further includes:
  executable instructions stored on a computer-readable medium for calculating a number of responses to the set of queries to be reviewed based on applying standard statistical sampling formulae to the plurality of claims.

65. The computer-readable medium of claim 55, further including:
  executable instructions stored on a computer-readable medium for determining productivity based on a number of the set of queries responded to.

66. The computer-readable medium of claim 55, further including:
  executable instructions stored on a computer-readable medium for generating a standard report.

67. The computer-readable medium of claim 55, further including:
  executable instructions stored on a computer-readable medium for generating a custom report.

68. The computer-readable medium of claim 55, wherein the executable instructions stored on a computer-readable medium for providing responses to a set of queries further includes:
  executable instructions stored on a computer-readable medium for providing for a standard set of inquires in the set of queries in an automobile line of insurance.

69. The computer-readable medium of claim 55, wherein the executable instructions stored on a computer-readable medium for providing responses to a set of queries further includes:
  executable instructions stored on a computer-readable medium for providing for a standard set of inquires in the set of queries in a liability line of insurance.

70. The computer-readable medium of claim 55, wherein the executable instructions stored on a computer-readable medium for providing responses to a set of queries further includes:
  executable instructions stored on a computer-readable medium for providing for a standard set of inquires in the set of queries in an accident line of insurance.

71. The computer-readable medium of claim 55, wherein the executable instructions stored on a computer-readable medium for providing responses to a set of queries further includes:
  executable instructions stored on a computer-readable medium for providing for a standard set of inquires in the set of queries in a property line of insurance.

72. The computer-readable medium of claim 55, wherein the executable instructions stored on a computer-readable medium for providing responses to a set of queries further includes:
  executable instructions stored on a computer-readable medium for providing for a standard set of inquires in the set of queries in a worker's compensation line of insurance.

73. The computer-readable medium of claim 59, wherein the executable instructions stored on a computer-readable medium for providing responses further includes:
  executable instructions stored on a computer-readable medium for providing for a standard set of best practices in an automobile line of insurance.

74. The computer-readable medium of claim 59, wherein the executable instructions stored on a computer-readable medium for providing responses further includes:
  executable instructions stored on a computer-readable medium for providing for a standard set of best practices in a liability line of insurance.

75. The computer-readable medium of claim 59, wherein the executable instructions stored on a computer-readable medium for providing responses further includes:
  executable instructions stored on a computer-readable medium for providing for a standard set of best practices in a property line of insurance.

76. The computer-readable medium of claim 59, wherein the executable instructions stored on a computer-readable medium for providing responses further includes:
  executable instructions stored on a computer-readable medium for providing for a standard set of best practices in an accident line of insurance.

77. The computer-readable medium of claim 59, wherein the executable instructions stored on a computer-readable medium for providing responses further includes:
  executable instructions stored on a computer-readable medium for providing for a standard set of best practices in a worker's compensation line of insurance.

78. The computer-readable medium of claim 55, wherein the queries are provided in English.

79. The computer-readable medium of claim 55, wherein the queries are provided in German.

80. The computer-readable medium of claim 55, wherein the queries are provided in Dutch.

81. The computer-readable medium of claim 55, wherein the claims are insurance claims.

82. An electronic data processing system for claims data analysis, comprising:
    means for receiving information associated with a plurality of processed claims;
    means for providing responses into the electronic data processing system in response to a set of queries associated with the information;
    means for selecting at least one subset of best practices from a predetermined set of best practices associated with a claims handling process;
    means for associating the subset of best practices with the responses;
    means for determining with the electronic data processing system a loss economic opportunity associated with processing the plurality of claims, where the loss economic opportunity includes a cost associated with processing the plurality of claims and is determined based on the responses; and
    means for identifying from the subset of best practices a best practice associated with processing the plurality of claims based on the loss economic opportunity.

83. The system of claim 82, wherein means for determining a best practice further includes:
    means for quantifying the best practice in terms of an economic effect in reduction of a cost associated with processing the plurality of claims.

84. The system of claim 82, wherein means for receiving information further includes:
    means for providing for at least one query to be completed in response to the information associated with each of the plurality of claims.

85. The system of claim 82, wherein providing responses further includes:
    means for providing the set of queries in more than one language; and
    means for allowing a user to toggle between queries in different languages.

86. The system of claim 84, wherein means for providing for at least one query further includes:
    means for designating at least one best practice used in processing each of the plurality of claims; and
    means for designating a weight for the one best practice to be applied to each of the plurality of claims.

87. The system of claim 82, wherein means for determining a loss economic opportunity further includes:
    means for determining an actual cost for processing each of the plurality of claims; and
    means for evaluating the loss economic opportunity as a percentage of an absolute loss economic opportunity divided by the total claim cost.

88. The system of claim 87, wherein means for determining an actual cost further includes:
    means for calculating the total claim cost as the sum of the indemnity and allocated loss adjustment expense.

89. The system of claim 87, wherein means for evaluating the loss economic opportunity further includes:
    means for calculating the loss economic opportunity for the plurality of claims by averaging the loss economic opportunity for each of the plurality of claims.

90. The system of claim 82, further including:
    means for generating at least one report indicating one of office organization, efficiency of processing the plurality of claims, and statistics on the processing of the plurality of claims.

91. The system of claim 82, wherein means for providing responses to a set of queries further includes:
    means for calculating a number of responses to the set of queries to be reviewed based on applying standard statistical sampling formulae to the plurality of claims.

92. The system of claim 82, further including:
    means for determining productivity based on a number of the set of queries responded to.

93. The system of claim 82, further including:
    means for generating a standard report.

94. The system of claim 82, further including:
    means for generating a custom report.

95. The system of claim 82, wherein means for providing responses to a set of queries further includes:
    means for providing for a standard set of inquires in the set of queries in an automobile line of insurance.

96. The system of claim 82, wherein means for providing responses to a set of queries further includes:
    means for providing for a standard set of inquires in the set of queries in a liability line of insurance.

97. The system of claim 82, wherein means for providing responses to a set of queries further includes:
    means for providing for a standard set of inquires in the set of queries in an accident line of insurance.

98. The system of claim 82, wherein means for providing responses to a set of queries further includes:
    means for providing for a standard set of inquires in the set of queries in a property line of insurance.

99. The system of claim 82, wherein means for providing responses to a set of queries further includes:
    means for providing for a standard set of inquires in the set of queries in a worker's compensation line of insurance.

100. The system of claim 86, wherein means for providing responses further includes:
    means for providing for a standard set of best practices in an automobile line of insurance.

101. The system of claim 86, wherein means for providing responses further includes:
    means for providing for a standard set of best practices in a liability line of insurance.

102. The system of claim 86, wherein means for providing responses further includes:
    means for providing for a standard set of best practices in a property line of insurance.

103. The system of claim 86, wherein means for providing responses further includes:
    means for providing for a standard set of best practices in an accident line of insurance.

104. The system of claim 86, wherein means for providing responses further includes:
    means for providing for a standard set of best practices in a worker's compensation line of insurance.

105. The system of claim 82, wherein the queries are provided in English.

106. The system of claim 82, wherein the queries are provided in German.

107. The system of claim 82, wherein the queries are provided in Dutch.

108. The system of claim 82, wherein the claims are insurance claims.

* * * * *

UNITED STATES PATENT AND TRADEMARK OFFICE
CERTIFICATE OF CORRECTION

| | | |
|---|---|---|
| PATENT NO. | : 7,376,573 B1 | Page 1 of 2 |
| APPLICATION NO. | : 09/559725 | |
| DATED | : May 20, 2008 | |
| INVENTOR(S) | : Michael A. Costonis et al. | |

It is certified that error appears in the above-identified patent and that said Letters Patent is hereby corrected as shown below:

On the Title Page

Left column, line 1, under "OTHER PUBLICATIONS", replace "Cecilia An actuarial viewpoint, (loss comparisons)," with --Cecilia, "An actuarial viewpoint, (loss comparisons)",--.

Left column, line 2, under "OTHER PUBLICATIONS", after "File 149" replace "Accesion" with --Accession--.

Right column, line 13, after "SAP," replace "Andersenoffer" with --Andersen offer--.

Right column, line 13, after "product;" replace "Trembly" with --Tremblay--.

Right column, line 13, after "Ara C;" replace "Ntional" with --National--.

In the Specification

In columns 3-4, in Table 1, line 2, under "Description", replace "claims the by the insured" with --claims by the insured--.

In columns 5-6, in Table 1-continued, line 17, under "Description", replace "claims is handled" with --claims are handled--.

In columns 5-6, in Table 1-continued, line 39, under "Description", replace "intermediate a car of" with --intermediate car of--.

In columns 5-6, in Table 1-continued, line 60, under "Description", immediately after "opportunity 40%" delete ")".

Signed and Sealed this
Twenty-sixth Day of July, 2011

David J. Kappos
*Director of the United States Patent and Trademark Office*

CERTIFICATE OF CORRECTION (continued)
U.S. Pat. No. 7,376,573 B1

In the Specification (cont'd)

In columns 5-6, in Table 1-continued, line 63, under "Description", replace "Assumption.: in 40%" with --Assumption: in 40%--.

In columns 7-8, in Table 1-continued, line 21, under "Description", replace "claims amount." with --claims amount).--.

In columns 7-8, in Table 1-continued, line 24, under "Description", replace "(using a expert/appraiser" with --(using an expert/appraiser--.

In columns 7-8, in Table 1-continued, line 46, under "Description", after "The service includes" replace "e.g. -to fetch" with --e.g. to fetch--.

In columns 9-10, in Table 1-continued, line 19, under "Description", before "(fraud investigation)" replace "conducted" with --conducting--.

In columns 9-10, in Table 1-continued, line 28, under "Description", after "Integration of" replace "calculated" with --calculation--.

In columns 9-10, in Table 1-continued, line 43, under "Description", after "Better: One" replace "consolidate" with --consolidated--.

In columns 9-10, in Table 1-continued, line 50, under "Description", after "devices, only" replace "get the paid the price" with --get the paid price--.

In columns 11-12, in Table 1-continued, line 13, under "Description", after "has a high" replace "risks" with --risk--.

In columns 11-12, in Table 1-continued, line 43, under "Description", immediately after "If not" insert --, an--.

In columns 11-12, in Table 1-continued, line 59, under Description", before "for attorneys" replace "ie." with --i.e.--.

In columns 13-14, in Table 1-continued, line 4, under "Description", after "claims to other" replace "Pipelines" with --Pipeline--.

In columns 13-14, in Table 1-continued, line 15, under "Description", immediately after "for Claims" delete ";".

In column 16, line 41, after "practice the number" replace "fo" with --of--.